April 28, 1953 R. E. MARBURY 2,636,921
FORCED-AIR VENTILATING SYSTEM FOR ELECTRICAL DEVICES
Filed Dec. 17, 1949 2 SHEETS—SHEET 1

WITNESSES:

INVENTOR
Ralph E. Marbury.
BY
ATTORNEY

April 28, 1953 R. E. MARBURY 2,636,921
FORCED-AIR VENTILATING SYSTEM FOR ELECTRICAL DEVICES
Filed Dec. 17, 1949 2 SHEETS—SHEET 2

WITNESSES:
Robert A. Baird
Nw. C. Groome

INVENTOR
Ralph E. Marbury.
BY F. P. Lyle
ATTORNEY

Patented Apr. 28, 1953

2,636,921

UNITED STATES PATENT OFFICE 2,636,921

FORCED-AIR VENTILATING SYSTEM FOR ELECTRICAL DEVICES

Ralph E. Marbury, Pittsburgh, Pa., assignor to Westinghouse Electric Corporation, East Pittsburgh, Pa., a corporation of Pennsylvania Application December 17, 1949, Serial No. 133,568

2 Claims. (Cl. 174—16)

The present invention relates to forced-air ventilating systems, and, more particularly, to forced air ventilation of electrical devices enclosed in housings, such as capacitor banks or assemblies. The invention is especially applicable to housed capacitor banks, but it will be apparent that its usefulness is not restricted to this particular application, and that it is generally applicable to the ventilation of any enclosed, heat-producing electrical device.

Capacitor banks, such as are used for power factor correction on distribution or transmission lines, consist of a suitable number of individual capacitor units of standard kvar. rating, mounted in a rack and enclosed in a protective housing, which may be made weatherproof if the bank is intended for outdoor use. The losses in the capacitor units, which appear as heat, raise the temperature within the housing, and the heat must be adequately dissipated in order to keep the operating temperature of the capacitor units within the permissible limits. When relatively small capacitor units are used, the natural circulation of air through the housing is usually adequate to dissipate the heat and prevent excessive temperature rise of the capacitors. When larger capacitor units, such as 25 kvar. units, are used, however, in compact housed assemblies, the losses are concentrated in a relatively smaller volume, and the amount of heat generated is such that the natural air circulation through the housing is inadequate to prevent the operating temperature of the capacitor units from exceeding the permissible limits, if the outside or ambient air temperature is relatively high, as in warm weather. For this reason, it is necessary to provide forced-air ventilation for housed capacitor assemblies of this kind, to supplement the natural circulation of air under high ambient temperature conditions, in order to prevent excessively high temperatures within the housing.

Forced-air ventilation can readily be provided for equipment of this kind by means of a fan or fans placed in the top of the housing and controlled thermostatically to start the fans when the temperature in the housing exceeds a predetermined value. The conventional arrangement of such a system is not satisfactory, however, since it results in too frequent starting and stopping of the fan motors. Thus, when the temperature within the housing exceeds the setting of the thermostat, the fans will start and cause rapid circulation of the outside air through the housing, so that the heated air in the housing will be entirely replaced by the cooler outside air within a few minutes. This results in lowering the temperature within the housing and stopping the fans, so that the temperature immediately begins to rise again until it reaches the point where the fans are again started. This process will be repeated over and over, and it will be obvious that the fan motors will be started and stopped very frequently as long as the outside air temperature is such that the internal temperature in the housing rises above the permissible limit when the fans are stopped. This repeated starting and stopping of the fan motors is undesirable, and may be harmful to the motors. It will also be apparent that the average temperature within the housing will be higher than is desirable, and the capacitor units will actually operate at a temperature above the permissible maximum. This type of thermostatically controlled forced-air ventilation, therefore, is not satisfactory for enclosed capacitor banks.

The principal object of the present invention is to provide a forced-air ventilating system for housed electrical devices, such as capacitor assemblies, utilizing thermostatically controlled fans for effecting circulation of air through the housing, and in which the fans will continue to operate after once being started until the temperature of the outside air has fallen substantially below the temperature which caused the excessive internal temperature in the housing.

Another object of the invention is to provide a forced-air ventilating system for electrical devices enclosed in a housing, utilizing thermostatically controlled fans for effecting circulation of air through the housing, in which the thermostat which controls the fans is sufficiently heated when the fans are started to keep the fans in continuous operation until the outside air temperature has fallen substantially below the temperature which caused the fans to start.

A further object of the invention is to provide a forced-air ventilating system for enclosed capacitor banks or assemblies, in which thermostatically controlled fans are utilized and the thermostat which controls the fans is provided with a heater, which may be wound on a tubular well in which the thermostat is located, and which is connected so as to be energized whenever the fan motors are energized, so that the thermostat is heated sufficiently to keep the fans in operation until the outside air temperature has fallen substantially below the temperature which caused the fans to start.

The invention will be more fully understood from the following detailed description, taken in connection with the accompanying drawings, in which.

Figure 1:
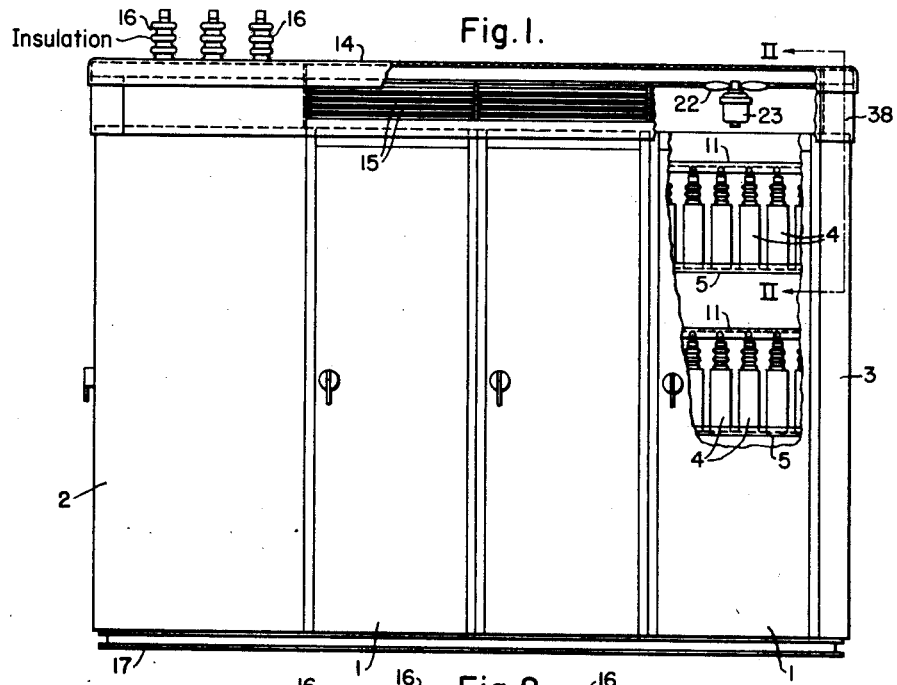
Figure 1 is a view in elevation of a housed capacitor bank, partly broken away to show the internal arrangement.
Figure 2:
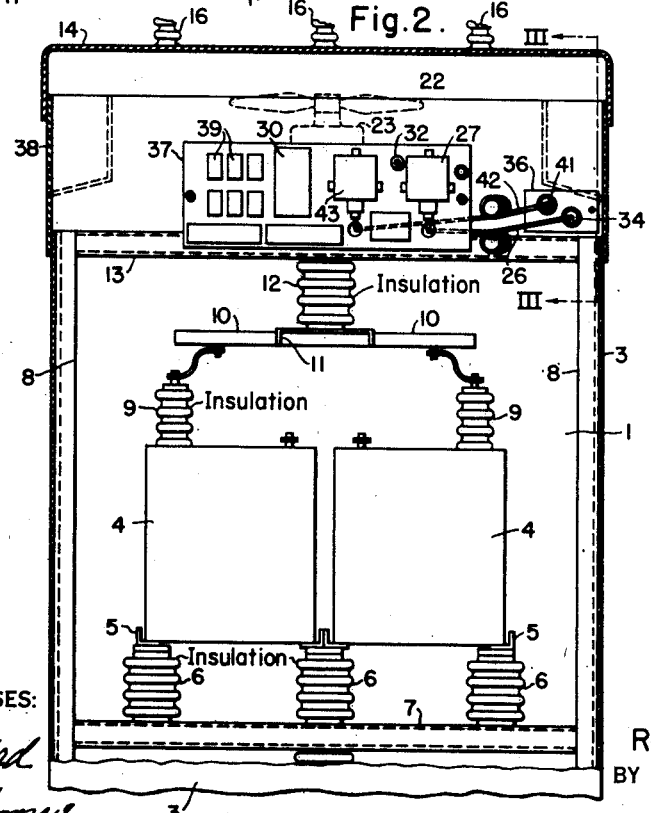
Figure 2 is a transverse sectional view of the upper part of one end of the capacitor bank, on an enlarged scale, the section being taken approximately on the line II—II of Figure 1.

The invention is shown in the drawings applied to an enclosed rack-type capacitor bank or assembly intended for outdoor service, although it will be understood that the invention is applicable to other types of enclosed capacitor assemblies or, in general, to any enclosed heat-producing electrical device. The capacitor bank shown in the drawings is enclosed in a housing which comprises a plurality of capacitor compartments 1 and preferably also a circuit breaker compartment 2. The capacitor compartments 1 are open at the sides but enclosed at the front and back, and are provided with doors to permit access to the interior of the compartments. As many compartments are utilized as may be required, depending on the size of the bank and the number of capacitor units needed, and the individual compartments are assembled side by side, as shown with the circuit breaker compartment 2 closing one end of the assembly. The other end of the assembly is closed by a sheet metal cover 3, so that the interior of the assembly is completely enclosed in a housing.

Each of the capacitor compartments 1 contains a suitable number of individual capacitor units 4 mounted in tiers on rails 5 extending longitudinally of the compartment and supported at the ends on insulators 6, which are mounted on transverse rails or structural members 7 extending between the vertical structural members 8 which form the framework of the compartment. The particular capacitor units 4 shown in the drawings are of the type having a single bushing 9, and the capacitor units are connected through individual fuses 10 to a bus structure 11, which runs longitudinally through all the compartments to the circuit breaker compartment 2, and which is supported by insulators 12 suspended from the upper structural members 13 of the compartments. It will be apparent that any desired type of capacitor units may be utilized, and that they may be connected together in any desired way in either a single-phase or a three-phase assembly. The top of the housing is closed by a roof structure 14, which includes louvers 15 at the top of each of the capacitor compartments to permit the discharge of air while excluding rain and snow from the interior. Entrance bushings 16 are mounted in the roof structure, and are preferably located over the circuit breaker compartment 2. It will be apparent that the construction described provides a housing completely enclosing the capacitor units 4, and the entire assembly may be mounted on rails 17, or other suitable supporting means, to permit the entrance of air through the bottom of the housing.

In the particular embodiment shown in the drawings, the capacitor units 4 are connected in a three-phase bank, and are connected to a three-phase line 18 through a circuit breaker 19, which is housed in the breaker compartment 2. The breaker 19 is shown as having a closing coil 20, which may be controlled either manually or automatically in any desired manner, and a trip coil 21, which may be controlled automatically, as described hereinafter, and which may also be controlled manually or by any additional automatic means, if desired.

As previously explained, if the capacitor units 4 are of large size, the losses are concentrated within a relatively small space, and the natural air circulation through the housing is inadequate to prevent the temperature within the housing from rising above the permissible limit, if the outside or ambient air is at a high temperature, as on a warm summer day. In order to obtain adequate dissipation of the heat, therefore, and prevent excessive temperature rise of the capacitor units 4, forced-air ventilation is provided by means of a plurality of fans 22. The fans 22 are evenly spaced longitudinally of the housing, to obtain equalized circulation of the air, and in the preferred embodiment, a fan is placed in the top of each of the capacitor compartments 1. The fans draw in air through the bottom of the housing and discharge it through the louvers 15 at the top, to provide forced circulation of air between and over the capacitor units 4 to dissipate the heat generated in them. The fans 22 are driven by individual motors 23, which are preferably single-phase motors, and which are connected in parallel to any suitable source of low-voltage, single-phase power, which may be obtained, for example, from a transformer 24 connected across one phase of the line 18.

The fan motors 23 are controlled by means of a thermostat 25 placed within one of the capacitor compartments to be responsive to the temperature within the housing. The thermostat 25 may be of any suitable type, and is shown as being a bulb-type thermostat, having a bulb containing a volatile fluid and connected by tubing 26 to a temperature control relay 27. The relay 27 has a normally open contact 28 which is adapted to be closed in response to expansion of the volatile fluid in the thermostat bulb when the temperature of the bulb exceeds a predetermined value for which the relay 27 is set. The contact 28 of the temperature control relay 27 is connected in series with the operating coil 29 of a relay 30 for controlling the fan motors 23. The relay 30 has a normally open contact 31 connected in series in the energizing circuit of the motors 23, so that when the contact 31 closes, the motors are all simultaneously energized. The coil 29 of the relay 30 is connected to be energized from the transformer 24 when the contact 28 of the temperature control relay 27 closes. Preferably, a manual transfer switch 32 is provided to permit either manual or automatic control of the fan motors 23. Thus, when the transfer switch 32 is on its right-hand contact, the coil 29 is connected across the transformer 24 in series with the contact 28 of the temperature control relay 27. If it is desired to operate the fan motors 23 manually and not under the control of the thermostat 25, the switch 32 may be placed on its left-hand contact to connect the relay coil 29 directly across the transformer.

Figure 4:
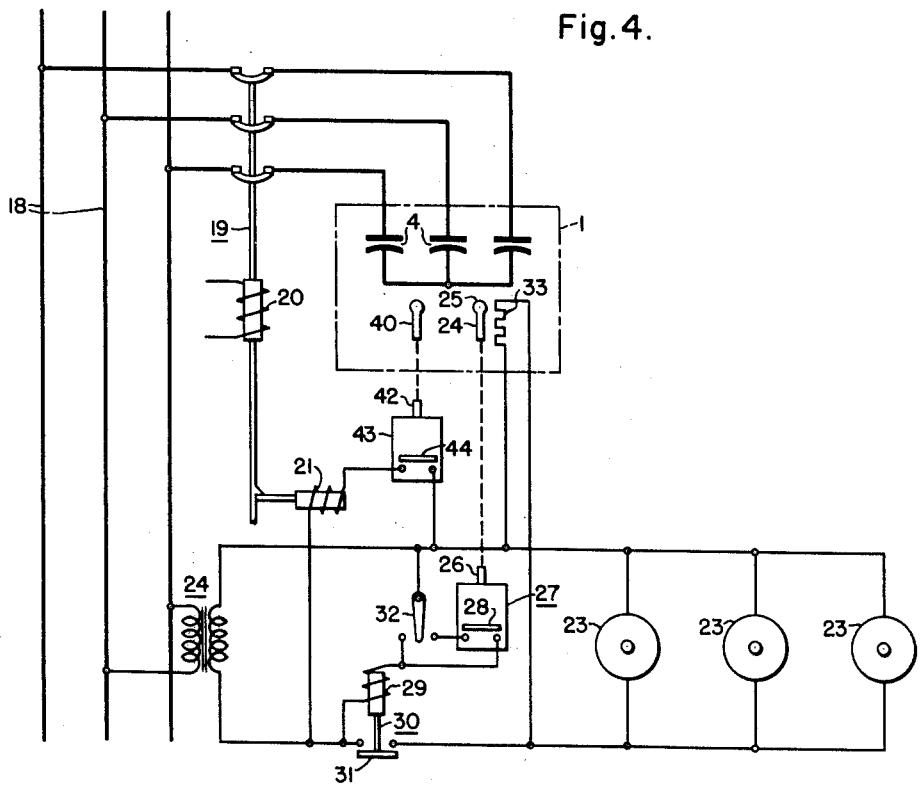
Figure 4 is a schematic wiring diagram showing the control circuit for the ventilating system.

As has previously been explained, the operation of the control system, as so far described, would not be satisfactory, because if the thermostat 25 were utilized alone, the motors 23 would be started and stopped too frequently, and the average temperature in the housing would be too high. In order to avoid this difficulty, in accordance with the present invention, the thermostat 24 is provided with a heater 33. The heater 33 is connected to be energized simultaneously with the energization of the fan motors 23 and to remain energized as long as the fan motors are in operation, to heat the thermostat, and thus keep the fans running until the temperature of the outside air entering the housing has dropped substantially. Preferably, the heater 33 is connected directly in parallel with the fan motors, as shown in Figure 4.

Figure 3:
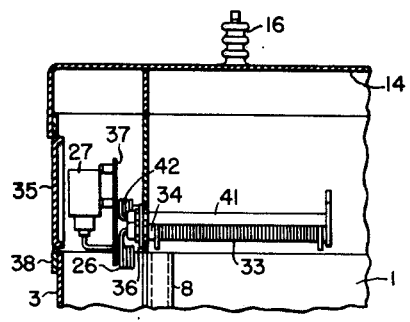
Figure 3 is a fragmentary sectional view of the upper part of one end of the assembly, looking from the rear, the section being taken approximately on the line III—III of Figure 2.

The thermostat 25 is preferably mounted in a well 34, which may comprise a suitable length of metal tubing extending into the upper part of the outside capacitor compartment I and supported on a plate 36 mounted on one of the structural members of the compartment. The heater 33 may then consist of a suitable number of turns of resistance wire wound directly on the outside of the well 34, as clearly shown in Figure 3. This provides a relatively simple and inexpensive construction which effectively exposes the thermostat 25 to the internal air temperature in the housing, and which directly associates the heater 33 with the thermostat in a simple and effective way. The temperature control relay 27 and the motor control relay 30 may be mounted on a panel 37 located in the upper part of the outside capacitor compartment and enclosed by a sheet metal cover 38, which may have a removable door 35 to permit access to the panel 37. If desired, other control and protective devices may also be mounted on the panel 37, such as the transfer switch 32, shown as a toggle switch, and individual overload protective relays 39 for the motors 23. The relays 39 are preferably arranged and connected so that operation of any one of them will cause deenergization of all the motors 23, as disclosed and claimed in a copending application of W. H. Cuttino, Serial No. 133,519, filed December 17, 1949, and assigned to Westinghouse Electric Corporation.

If desired, backup protection may be provided, to prevent damage to the capacitors 4 by excessive temperatures, by means of a second thermostat 40 disposed in a second well 41 mounted adjacent the well 34 on the plate 36. The thermostat 40 may be of the same type as the thermostat 25 and is connected by tubing 42 to a second temperature control relay 43 having a contact 44 connected in series with the trip coil 21 of the breaker 19 across the transformer 24. The temperature control relay 43 may be of the same type as the relay 27 and is adapted to close its contact 44 in response to expansion of the volatile fluid in the thermostat bulb when the temperature of the bulb exceeds the predetermined value for which the relay 43 is set.

The operation of this ventilating system is as follows. If the temperature inside the housing, to which the thermostat 25 is exposed, exceeds the predetermined value for which the temperature control relay 27 is set, the thermostat 25 causes the relay 27 to close its contact 28. If the transfer switch 32 is on its right-hand contact, for automatic operation, the coil 29 of the relay 30 is connected across the transformer 24 when the contact 28 closes and is energized to actuate the relay 30 and cause it to close its contact 31. This energizes all the fan motors 23, and starts the fans in operation to effect an increased circulation of outside air through the housing to carry away the heat generated in the capacitor units. The heater 33 is energized simultaneously with the energization of the fan motors 23 and heats the thermostat 25 to further raise its temperature. Thus, even when the heated air in the housing has been entirely replaced by the cooler outside air, which normally occurs within a few minutes after the fans have been started, the thermostat 25 is maintained above the temperature setting of the relay 27 by the additional heat supplied to it by the heater 33. The contact 28 remains closed, therefore, and the fans continue in operation. Thus, the fans 22 will continue to operate until the temperature of the outside air entering the housing has dropped substantially below its temperature at the time the fans were started, which caused the excessive temperature in the housing. On a warm day, for example, when the outside air temperature rises to the point where the natural circulation of air through the housing becomes inadequate, and the internal temperature in the housing becomes excessive, the fans will be started. Because of the presence of the heater 33, when the fans have once been started, they will continue in operation until the day's temperature peak has passed, and the outside temperature has fallen to a point where the natural circulation of the outside air through the housing will provide adequate cooling. When the temperature of the incoming air has fallen to this extent, the temperature of the thermostat 25, even with the added heat from the heater 33, will drop to the point where the contact 28 opens and deenergizes the relay 30 to effect deenergization of the fan motors 23. In this way, repeated starting and stopping of the fan motors is prevented, and the temperature in the housing is kept within the permissible limits, since the fans run continuously as long as the outside air temperature is high enough to make the natural circulation of air inadequate.

If the temperature in the housing rises substantially above the temperature setting of the relay 27 for any reason, such as failure of a fan motor, the backup thermostat 40 actuates the temperature control relay 43, which is preferably set for a somewhat higher temperature than the relay 27, and causes it to close its contact 44 and thus trip the circuit breaker 19 to deenergize the capacitor bank and protect it from the damaging effects of the excessive temperature.

It should now be apparent that a forced-air ventilating system has been provided for housed capacitor banks, or other enclosed electrical devices, which provides effective ventilation and which avoids too frequent starting and stopping of the fan motors. It will be understood, of course, that although a specific preferred embodiment of the invention has been shown and described for the purpose of illustration, it is capable of various modifications, and of other embodiments, and that the invention is not limited to the specific arrangement shown and described, but in its broadest aspects, it includes all equivalent embodiments and modifications which come within the scope of the appended claims.

I claim as my invention:

1. A forced-ventilated capacitor assembly comprising a housing, a plurality of capacitor units disposed in the housing, a ventilating fan in the housing for effecting circulation of outside air therethrough, an electric motor for driving said ventilating fan, a tubular well extending into the housing, a temperature-responsive device disposed in said well to respond to the temperature in the housing, an electric heating element wound on the outside of the well and connected in parallel with said motor, and means actuated by the temperature-responsive means for effecting energization of the motor and the heating element to drive the fan and to supply heat to the temperature-responsive means to keep the fan in operation until the temperature in the housing has dropped substantially below the temperature which caused the fan to be started.

2. A forced-ventilated capacitor assembly comprising a housing, a plurality of capacitor units disposed in the housing, a plurality of ventilating fans disposed in the upper part of the housing for effecting circulation of outside air therethrough, electric motors for driving said ventilating fans, a tubular well of thermally-conductive material extending into the housing, a temperature-responsive device disposed in said well to respond to the temperature in the housing, an electric heating element wound on the outside of the well, and means actuated by the temperature-responsive means for effecting substantially simultaneous energization of said motors and of said heating element to drive the fans and to supply heat to the temperature-responsive means to keep the fans in operation until the temperature in the housing has dropped substantially below the temperature which caused the fans to be started.

RALPH E. MARBURY.

References Cited in the file of this patent
UNITED STATES PATENTS

| Number | Name | Date |
|---|---|---|
| 1,793,954 | Myers | Feb. 24, 1931 |
| 2,167,472 | Bedford | July 25, 1939 |
| 2,248,924 | Holmes | July 15, 1941 |
| 2,300,418 | Hall | Nov. 3, 1942 |
| 2,467,018 | Eggleston | Apr. 12, 1949 |
| 2,478,588 | Lehane et al. | Aug. 9, 1949 |